(12) United States Patent
Ono et al.

(10) Patent No.: US 10,941,365 B2
(45) Date of Patent: Mar. 9, 2021

(54) METHOD FOR MANUFACTURING SOLID FUEL AND SOLID FUEL

(71) Applicant: NIPPON PAPER INDUSTRIES CO., LTD., Tokyo (JP)

(72) Inventors: Hiroshi Ono, Tokyo (JP); Hiroshi Shinkura, Tokyo (JP); Tomonori Kawamata, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 14/431,404

(22) PCT Filed: Sep. 26, 2013

(86) PCT No.: PCT/JP2013/076058
§ 371 (c)(1),
(2) Date: Mar. 26, 2015

(87) PCT Pub. No.: WO2014/050964
PCT Pub. Date: Apr. 3, 2014

(65) Prior Publication Data
US 2015/0259616 A1    Sep. 17, 2015

(30) Foreign Application Priority Data
Sep. 28, 2012   (JP) ............................. JP2012-218004

(51) Int. Cl.
*C10L 5/44*    (2006.01)
*C10L 9/08*    (2006.01)
*C10L 5/08*    (2006.01)
*C10L 5/28*    (2006.01)
*C10L 5/36*    (2006.01)

(52) U.S. Cl.
CPC ................. *C10L 5/442* (2013.01); *C10L 5/08* (2013.01); *C10L 5/28* (2013.01); *C10L 5/363* (2013.01); *C10L 9/08* (2013.01); *C10L 9/083* (2013.01); *C10L 2200/0469* (2013.01); *C10L 2290/06* (2013.01); *C10L 2290/08* (2013.01); *C10L 2290/28* (2013.01); *C10L 2290/30* (2013.01); *Y02E 50/10* (2013.01); *Y02E 50/30* (2013.01)

(58) Field of Classification Search
CPC ......... C10L 2200/0469; C10L 2290/06; C10L 2290/08; C10L 2290/28; C10L 2290/30; C10L 5/08; C10L 5/28; C10L 5/363; C10L 5/442; C10L 9/08; C10L 9/083; Y02E 50/10; Y02E 50/15; Y02E 50/30
USPC ......................................................... 44/490
See application file for complete search history.

(56) References Cited

U.S. PATENT DOCUMENTS

| 4,015,951 | A  | * | 4/1977 | Gunnerman | ............... | C10L 5/44 44/595 |
| 7,931,784 | B2 | * | 4/2011 | Medoff | .................... | C10G 3/00 204/157.63 |
| 8,231,696 | B2 | * | 7/2012 | Ruiters | ................... | C10B 53/00 44/500 |
| 2003/0221363 | A1 | * | 12/2003 | Reed | ....................... | C10L 5/361 44/594 |
| 2007/0266623 | A1 | * | 11/2007 | Paoluccio | ............... | C10B 53/02 44/629 |
| 2010/0101141 | A1 | * | 4/2010 | Shulenberger | .......... | C10B 47/44 44/589 |

FOREIGN PATENT DOCUMENTS

| CA | 1184761 | A | * | 4/1985 | ............... C10L 5/44 |
| JP | 11-61142 |  |  | 3/1999 | |
| JP | 2003-206490 |  |  | 7/2003 | |
| JP | 2006-26474 |  |  | 2/2006 | |
| JP | 2008-274110 |  |  | 11/2008 | |
| JP | 2009-191085 |  |  | 8/2009 | |
| JP | 2009191085 | A | * | 8/2009 | |
| JP | 2009191085 | A | * | 8/2009 | |

OTHER PUBLICATIONS

Central Research Institute of Electric Power Industry, Japan, "Development of an apparatus for evaluating characteristics of biomass carbonization", Report No. M 11014. Apr. 2012. pp. 1-2 (Year: 2012).*
Niigata, "Raw material moisture content appropriate for Japanese cedar bark pellet manufacturing", Department of Agriculture, Forestry and Fisheries, Forest Research Institute Research report, Research report for fiscal year 2010. pp. 1-2 (Year: 2010).*
International Search Report for PCT/JP2013/076058 dated Dec. 10, 2013, four pages.
Japanese Office Action issued in Appln. No. 2014-538587 dated Jul. 10, 2017 (with computer translation).
Japanese Office Action issued in Appln. No. 2014-538587 dated Oct. 6, 2017 (with computer translation).
Biomass carbonization characteristic evaluation system development-, Central Research Institute of Electric Power Industry report, Apr. 2012, and report No. M11014.

(Continued)

*Primary Examiner* — Latosha Hines
(74) *Attorney, Agent, or Firm* — Nixon & Vanderhye PC

(57) ABSTRACT

A method is provided for producing a solid fuel to be used as fuel for a pulverized coal boiler from wood biomass as a source material at a high mass yield and calorie yield by performing a grinding treatment in a mixture with coal. A solid fuel is produced by adjusting the moisture of a ground powder of wood biomass to between 8 and 50%; densifying the ground powder of wood biomass to a bulk density of 0.55 g/cm³ or higher (measured according to JIS K 2151-6 "Bulk density test method"); and then subjecting the ground powder of wood biomass to torrefaction under conditions of an oxygen concentration of 10% or less and a temperature between 170 and 350° C. Since the bulk density of a source material is high, a trouble in conveyance such as clogging of a rotary valve at an inlet of a carbonization furnace, or clogging of a cyclone after a drier due to excessive reject can be prevented.

7 Claims, No Drawings

(56) References Cited

OTHER PUBLICATIONS

Wood pellet manufacture examination which used Japan cedar bark as materials, Niigata forest research institute report of research, 2011, No. 52, 49-52 pages.

Translation of Biomass carbonization characteristic evaluation system development-, Central Research Institute of Electric Power Industry report, Apr. 2012, and report No. M11014.

Translation of Wood pellet manufacture examination which used Japan cedar bark as materials, Niigata forest research institute report of research, 2011, No. 52, 49-52 pages.

Third Party Submission for corresponding CA application No. 2885804, including Annex A, B (w/ translation), and C (w/ translation) that correspond to the cited references of the CA Office Action (dated Sep. 27, 2019).

Office Action issued in corresponding CA application No. 2885804, including Annex A, B (w/ translation), and C (w/ translation) that correspond to the cited references of the CA Office Action (dated Sep. 27, 2019).

Central Research Institute of Electric Power Industry, Japan, "Development of an apparatus for evaluating characteristics of biomass carbonization", Report No. M 11014, pp. 1-2, http://criepi.denken.or.jp/jp/kenkikaku/report/leafleUM11014.pdf, Apr. 31, 2012 (w/ translation).

Niigata, "Raw material moisture content appropriate for Japanese cedar bark pellet manufacturing", *Department of Agriculture, Forestry and Fisheries, Forest Research Institute, Research reporl*, Research report for fiscal year 2010, pp. 1-2, http://www.pref.niigata.lg.jp/HTML_Article/71/323/22_2_sigijuhiperetto.pdf, Jul. 2, 2010 (Feb. 7, 2010) (w/ translation).

\* cited by examiner

METHOD FOR MANUFACTURING SOLID FUEL AND SOLID FUEL

This application is the U.S. national phase of International Application No. PCT/JP2013/076058 filed 26 Sep. 2013 which designated the U.S. and claims priority to JP Patent Application No. 2012-218004 filed 28 Sep. 2012, the entire contents of each of which are hereby incorporated by reference.

TECHNICAL FIELD

The present invention relates to a method for producing a solid fuel to be obtained by torrefaction of wood biomass.

BACKGROUND ART

As a countermeasure to depletion of fossil fuels and global warming due to $CO_2$ emission, utilization of a fuel using biomass as a source material has been investigated recently. Generally, biomass means a biological material, which can be utilized as an energy source or an industrial source material, and typical examples thereof are wood, construction waste wood, and agricultural waste.

Various methods for utilizing biomass effectively have been heretofore proposed. Among them, there is a method of producing a solid fuel by carbonizing biomass as a useful method for converting biomass to a high-value added material at a low cost. By this method, biomass is charged in a carbonization furnace, which is then heated in an oxygen deficient atmosphere for a predetermined time duration, so that a carbonization treatment is performed to produce a solid fuel.

A solid fuel thus produced can be used as a fuel for a combustion facility, such as an electricity generation facility and an incineration facility, but in this case a solid fuel may be sometimes ground to a fine powder fuel and then used, so as to enhance the combustion efficiency. A solid fuel is ground singly or in a mixture with coal, however, wood biomass among various biomasses is mostly fibrous and exhibits poor grindability, and has had drawbacks, such as decrease in combustion efficiency or, decrease in operability of a grinder.

Patent Literature 1 discloses a method by which wood biomass, such as waste timber, wood from forest-thinning, garden tree, and construction waste wood, is subjected to thermolysis at a temperature from 240° C. to 300° C. for a time duration from 15 min to 90 min, and then to grinding. It also discloses that when the heating temperature is a temperature below 240° C., the crushability and grindability are not enhanced, and when the heating temperature is a temperature above 300° C., the amount of fine powder with a size of submicron order increases during crushing or grinding and a powder handling trouble becomes liable to occur, both of which are therefore not preferable.

Patent Literature 2 discloses a method, by which biomass containing cereal, fruit, or seed is subjected to a carbonization treatment where the biomass is heated at an oxygen concentration from 1 to 5%, a treatment temperature from 350 to 400° C. for 30 to 90 min to produce a solid fuel having grindability equivalent to coal.

CITATION LIST

Patent Literature

Patent Literature 1: Japanese Patent Laid-Open No. 2006-026474

Patent Literature 2: Japanese Patent Laid-Open No. 2009-191085

SUMMARY OF INVENTION

Technical Problem

However, a carbonized material produced by a method described above is low in the mass yield and calorie yield, and insufficient in grindability compared to coal, so that the same can be hardly subjected to a grinding treatment in a mixture with coal for use as a fuel for a pulverized coal boiler.

Solution to Problem

The inventors studied diligently to solve the above problems, and finally found that a solid fuel having grindability equivalent to coal can be produced by adjusting the moisture of a ground powder of wood biomass to between 10 and 50%; then densifying the ground powder of wood biomass to a bulk density of 0.55 $g/cm^3$ or higher as a source material; and subjecting the ground powder of wood biomass to torrefaction under conditions of an oxygen concentration of 10% or less and a temperature between 170 and 350° C.

The present invention includes the following embodiments, provided being not limited thereto.

<1> A method for producing a solid fuel comprising: adjusting the moisture of a ground powder of wood biomass to between 8 and 50%; densifying the ground powder of wood biomass to a bulk density of 0.55 $g/cm^3$ or higher; and then subjecting the ground powder of wood biomass to torrefaction under conditions of an oxygen concentration of 10% or less and a temperature between 170 and 350° C.

<2> The method according to <1> above, wherein the wood biomass includes bark.

<3> The method according to <1> or <2> above, wherein a Hardgrove grindability index of the solid fuel is from 30 to 70.

<4> The method according to any one of <1> to <3> above, wherein the torrefaction is conducted at between 200 and 330° C.

<5> The method according to any one of <1> to <4> above, wherein the moisture of the ground powder of wood biomass is adjusted to between 8 and 30%.

<6> The method according to any one of <1> to <5> above, wherein the solid fuel is a solid fuel to be cofired with coal.

<7> A solid fuel obtained by adjusting the moisture of a ground powder of wood biomass to between 8 and 50%, densifying the ground powder of wood biomass to a bulk density of 0.55 $g/cm^3$ or higher, and then subjecting the ground powder of wood biomass to torrefaction under conditions of an oxygen concentration of 10% or less, and a temperature between 170 and 350° C.

<8> A solid fuel obtained by torrefaction of wood biomass, wherein the solid fuel has a mass yield of 60 to 90%, a calorie yield of 70 to 95%, and a Hardgrove grindability index (HGI) of 30 to 70.

Advantageous Effects of Invention

Since a solid fuel to be obtained by a producing method according to the present invention exhibits a high mass yield and calorie yield, and grindability equivalent to coal, the solid fuel can be subjected to a grinding treatment mixedly with coal, and blended at a high ratio with coal for use as a fuel for a pulverized coal boiler.

DESCRIPTION OF EMBODIMENTS

According to the present invention, wood biomass is used as a source material. Examples of wood biomass include wood chips, bark, wood shavings, and sawdust. Currently a large portion of the wood biomass is not utilized and just discarded. Especially, it has been found that, when bark as a source material is torrefied, a solid fuel with better qualities can be obtained compared to xylem chips. Since the content of hemicellulose in bark is lower than in xylem, the mass yield through torrefaction can be higher. Therefore according to a preferable embodiment of the present invention, wood biomass contains bark. Further, a wood biomass source material composed solely of bark may be used according to the present invention. Although, with respect to a tree type, either of hardwood and softwood may be used, softwood is preferable, and bark of red cedar is preferable.

According to the present invention, wood biomass is used in a form of a ground powder. A ground powder of wood biomass ground to a size from 0.1 to 100 mm is preferably used, and that in a size from 0.1 to 50 mm is further preferably used. In this regard, the size of a ground powder of wood biomass means a value obtained by classification by means of the size of round holes of a classifier. As an apparatus for grinding wood biomass, a cutter knife-type biomass fuel chipper is preferable.

According to the present invention, a ground powder of wood biomass is densified. Densification according to a preferable embodiment of the present invention means a treatment by which a ground powder of wood biomass is molded into a form of briquette or pellet. By performing the molding treatment, the bulk density can be increased significantly. Although the bulk density of a ground powder of wood biomass before the densification is from approx. 0.01 g/cm$^3$ to 0.3 g/cm$^3$, the bulk density after the densification treatment is from 0.55 g/cm$^3$ to 1.0 g/cm$^3$.

The bulk density of a ground powder of wood biomass after the densification treatment is required to be 0.55 g/cm$^3$ or higher, and is preferably 0.6 g/cm$^3$ or higher. In a case in which the bulk density is less than 0.55 g/cm$^3$, when a solid fuel is burned in a pulverized coal boiler as a fuel, the volume in a milling chamber of a pulverized coal mill becomes too large and the solid fuel spills therefrom, and therefore the blend ratio with coal cannot be so high and as the result advantageous effects of the present invention cannot be attained to a maximum extent.

It is necessary to adjust the moisture of a bark ground powder to 10 to 50% before densification according to the present invention, and preferably to the moisture of 10 to 30%. When the moisture is less than 10% clogging occurs inside a briquetter or a pelletizer, and a molded product cannot be produced stably. When the moisture exceeds 50%, molding becomes impossible and the product is discharged in a powder form or a paste form.

It is preferable that 0 to 50 parts by weight of a binder is added on the occasion of densification according to the present invention. There is no particular restriction on a binder, and preferable examples thereof include an organic macromolecule (such as lignin), an inorganic macromolecule (such as acrylamide), and an agricultural residue (such as bran (residue generated during flour production)). From a viewpoint of an object of efficient and effective utilization of bark, a smaller addition amount of a binder, namely 0 to 50 parts by weigh is preferable, and 0 to 20 parts by weight is more preferable. However, even if 50 parts by weight or more is added, densification is not necessarily impossible.

There is no particular restriction on an apparatus for preforming a densification treatment according to the present invention, and preferable examples thereof include a briquetter (produced by Kitagawa Iron Works Co., Ltd.), a ring die pelletizer (produced by California Pellet Mill, or produced by Miike Inc.), and a flat die pelletizer (produced by Dalton Co., Ltd.)

Torrefaction according to the present invention means a heat treatment in a low oxygen atmosphere at a relatively low temperature. Although an ordinary temperature for a wood carbonization treatment is from 400 to 1200° C., the torrefaction according to the present invention is conducted at a lower temperature (from 170 to 350° C.). By performing torrefaction, a solid fuel having energy density higher than a starting material can be obtained.

The treatment conditions for torrefaction according to the present invention are an oxygen concentration of 10% or less and a temperature from 170 to 350° C. When the oxygen concentration exceeds 10%, the mass yield and calorie yield decrease. When the temperature is less than 170° C., the grindability, which will be described later, becomes insufficient, and when the temperature exceeds 350° C., the mass yield and calorie yield decrease. The temperature is preferably from 170 to 340° C., and further preferably from 200 to 330° C. Since thermolysis of hemicellulose becomes remarkable near 270° C., in contrast thereto thermolysis of cellulose is remarkable near 355° C. and of lignin remarkable near 365° C., it is presumed that a solid fuel which is superior both in mass yield and grindability can be produced by selecting a torrefaction treatment temperature between 170 and 350° C. so as to perform thermolysis of hemicellulose preferentially.

Although there is no particular restriction on an apparatus for conducting a torrefaction treatment according to the present invention, a rotary kiln, and a shaft furnace are preferable. Further, in order to adjust an oxygen concentration at 10% or less, it is preferable to replace the internal atmosphere of the apparatus with an inert gas such as nitrogen, etc. The treatment time is preferably from 15 to 180 min.

In a preferable embodiment of a solid fuel obtained according to the present invention, the mass yield is from 60 to 90%, and the calorie yield is from 70 to 95% with respect to a wood biomass source material. Further, the Hardgrove grindability index (HGI) provided for according to JIS M 8801: 2004, which is an index for grindability, is preferably 30 or higher, and further preferably 40 or higher. A higher HGI value means easier grindability. When HGI is in a range from 30 to 70, the solid fuel can be mixed with coal and treated for grinding. Since the HGI of coal is ordinarily from 40 to 70, the solid fuel produced according to the present invention has grindability equivalent to coal.

EXAMPLES

The present invention will be described in detail hereinafter by way of Examples, provided that the present invention is not limited thereto. Further, parts, %, etc. are herein based on weight and a described numerical range includes the end point values.

Example 1

Bark of red cedar was subjected to a grinding treatment by a cutter knife-type biomass fuel chipper (Wood Hacker MEGA360DL, produced by Ryokusan Co., Ltd.). The bark ground powder was passed through a 70 mm screen, and subjected to a drying treatment by a drier at 120° C. for 10 min for adjusting the moisture to 12%.

Then, the moisture-adjusted bark ground powder was subjected to a densification treatment by a ring die formula pelletizer (MIIKE multi-purpose granulator Pellet Mill SPM-500, MIIKE Inc.) using a ring die having a die hole diameter of 6 mm, and a die thickness of 36 mm to obtain pellets with a bulk density of 0.60 g/cm$^3$.

Next, using the pellets as a source material, a solid fuel was produced by a large scale kiln type carbonization furnace. Specifically, after purging with nitrogen (oxygen concentration less than 1%), torrefaction was performed at a temperature of 310° C. for a retention time of 30 min to obtain a solid fuel.

The bulk density was measured by a method according to JIS K 2151-6 "Bulk density test method".

Example 2

Sander dust from a lumbering mill (size of ground powder: approx. 7 mm or less) was used as a source material and the moisture thereof was adjusted to 10%. Then, performing a densification treatment identically with Example 1, pellets with a bulk density of 0.69 g/cm$^3$ were obtained. Next, torrefaction was conducted identically with Example 1 using the pellets as a source material to obtain a solid fuel.

Example 3

Lumber scrap shredder dust (size of ground powder: approx. 7 mm or less) was used as a source material and the moisture thereof was adjusted to 10%. Then, performing a densification treatment identically with Example 1, pellets with a bulk density of 0.68 g/cm3 were obtained. Next, torrefaction was conducted identically with Example 1 using the pellets as a source material to obtain a solid fuel.

Example 4

Lumber planer dust (size of ground powder: approx. 5 mm or less) was used as a source material and the moisture thereof was adjusted to 10%. Then, performing a densification treatment identically with Example 1, pellets with a bulk density of 0.69 g/cm$^3$ were obtained. Next, torrefaction was conducted identically with Example 1 using the pellets as a source material to obtain a solid fuel.

Comparative Example 1

Red cedar bark was subjected to a grinding treatment by a hammer mill (PROGRIND 1500T, produced by Prrsident Husky Corporetion). The ground bark powder (moisture content: approx. 55%) was passed through a 100 mm-screen, and without moisture adjustment subjected to a densification treatment identically with Example 1, however not molded successfully. A powder with a bulk density of 0.078 g/cm$^3$ was obtained.

Then it was tried to carbonize the powder identically with Example 1, however clogging of a rotary valve at an inlet of a carbonization furnace, or clogging of a cyclone after drying occurred, and a solid fuel could not be produced. In this regard, clogging of a cyclone occurring after drying means clogging which occurs when a dust generated in a carbonization furnace is discharged together with an effluent gas from the carbonization furnace, and treated by a cyclone.

Comparative Example 2

Red cedar bark used in Example 1 and Comparative Example 1 (before grinding) was used as a solid fuel sample in Comparative Example 2.

Evaluation of Solid Fuel

Solid fuels obtained in Examples 1 to 4, and Comparative Example 2 were evaluated with respect to the following items. The results are shown in Table 1.

Mass yield: Calculated from sample weights before and after the torrefaction

Calorie yield: Calculated from heat values of samples before and after the torrefaction measured by a Nenken-type automated bomb calorimeter CA-4PJ from Shimadzu.

Grindability: A sample was ground by a ball mill at 200 rpm and for 4 min, passed through a 200 mesh screen, and the weight of the sample was measured to evaluate grindability. A HGI of a solid fuel sample was determined, mutatis mutandis according to a Hardgrove grindability index, which is an index for grindability of coal (HGI, JIS M 8801: 2004). Smaller HGI means, it is more difficult to grind the sample.

TABLE 1

| | Source material Bulk density g/cm$^3$ | Feed rate kg/h | Moisture adjustment condition | | Torrefaction operation condition | | |
|---|---|---|---|---|---|---|---|
| | | | Temperature after drier ° C. | Retention time in drier min | Temperature at carbonization furnace inlet ° C. | Temperature at carbonization furnace outlet ° C. | Retention time in carbonization furnace min |
| Example 1 | 0.60 | 1000 | 120 | 10 | 310 | 310 | 30 |
| Example 2 | 0.69 | 1000 | 120 | 10 | 310 | 310 | 30 |
| Example 3 | 0.68 | 1000 | 120 | 10 | 310 | 310 | 30 |
| Example 4 | 0.69 | 1000 | 120 | 10 | 310 | 310 | 30 |
| Comparative Example 1 | 0.078 | 200 | 120 | 10 | 310 | 310 | 30 |
| Comparative Example 2 | | | | | | | |

TABLE 1-continued

| | | Operability | | Fuel quality | | |
| --- | --- | --- | --- | --- | --- | --- |
| | | Clogging in rotary valve at carbonization furnace inlet | Clogging in cyclone after drier | Mass yield % | Calorie yield % | HGI |
| | Example 1 | none | none | 77.5 | 89.4 | 55 |
| | Example 2 | none | none | 77.2 | 89.1 | 46 |
| | Example 3 | none | none | 79.1 | 90.4 | 43 |
| | Example 4 | none | none | 83.5 | 92.1 | 41 |
| | Comparative Example 1 | occurred | occurred | — | — | — |
| | Comparative Example 2 | | | | | 23 |

As shown in Table 1, when wood biomass, which was adjusted with respect to the moisture to 8 to 50% and densified to a bulk density of 0.55 g/cm³ or higher, was used as a source material for producing a solid fuel (Examples 1 to 4), clogging of a rotary valve at an inlet of a carbonization furnace, or clogging of a cyclone after drying did not occur. Further, the solid fuels of Examples 1 to 4 produced by torrefaction exhibited a high mass yield and calorie yield and a Hardgrove grindability index (HGI) in a range of 30 to 70 indicating good grindability.

On the other hand in the case of Comparative Example 1 having used a source material with a bulk density less than 0.5 g/cm³, clogging of a rotary valve at an inlet of a carbonization furnace, or clogging of a cyclone after drying occurred, and a solid fuel could not be produced. Meanwhile, HGI of the untreated bark in Comparative Example 2 was less than 30 indicating poor grindability.

The invention claimed is:

1. A method for producing a solid fuel pellet comprising:
adjusting the moisture of a ground powder of wood biomass comprising bark to between 10 and 30% by a dryer;
densifying the ground powder of wood biomass to prepare a pellet having a bulk density of from 0.60 g/cm³ to 1.0 g/cm³; and
then subjecting the pellet to torrefaction under conditions of an oxygen concentration of 10% or less and a temperature between 200 and 330° C. by a rotary kiln purged with nitrogen for 15 to 180 min to obtain the solid fuel pellet,
wherein the size of the ground powder of wood biomass is between 0.1 to 100 mm, and
wherein the solid fuel pellet has a mass yield of 60 to 90% and a calorie yield of 70 to 95%, and wherein the solid fuel pellet has a Hardgrove grindability index is from 30 to 70 and the solid fuel pellet is a solid fuel configured to be cofired with coal.

2. The method according to claim 1, wherein the size of the ground powder of wood biomass is between 0.1 to 50 mm.

3. The method according to claim 1, wherein the bark comprises bark of red cedar.

4. The method of according to claim 1, wherein the ground powder of wood biomass is prepared using a cutter knife-type biomass fuel chipper.

5. The method according to claim 1, wherein the ground powder of wood biomass is densified using a ring die pelletizer and/or a flat die pelletizer.

6. A solid fuel pellet obtained by adjusting the moisture of a ground powder of wood biomass comprising bark to between 10 and 30% by a dryer, densifying the ground powder of wood biomass to prepare a pellet having a bulk density of from 0.60 g/cm³ to 1.0 g/cm³, and then subjecting the pellet to torrefaction under conditions of an oxygen concentration of 10% or less and a temperature between 200 and 330° C. by a rotary kiln purged with nitrogen for 15 to 180 min, wherein the size of the ground powder of wood biomass is between 0.1 to 100 mm, and wherein the solid fuel pellet has a mass yield of 60 to 90% and a calorie yield of 70 to 95%, and wherein the solid fuel pellet has a Hardgrove grindability index is from 30 to 70 and the solid fuel pellet is a solid fuel configured to be cofired with coal.

7. The solid fuel pellet according to claim 6, wherein the size of the ground powder of wood biomass is between 0.1 to 50 mm.

* * * * *